(12) United States Patent
Tang

(10) Patent No.: US 7,957,076 B2
(45) Date of Patent: Jun. 7, 2011

(54) OPTICAL LENS SYSTEM FOR TAKING IMAGE

(75) Inventor: Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 53 days.

(21) Appl. No.: 12/563,126

(22) Filed: Sep. 19, 2009

(65) Prior Publication Data

US 2010/0321796 A1    Dec. 23, 2010

(30) Foreign Application Priority Data

Jun. 19, 2009 (TW) .............................. 98120681 A

(51) Int. Cl.
*G02B 13/18* (2006.01)
(52) U.S. Cl. .................... 359/717; 359/794; 359/793
(58) Field of Classification Search .................. 359/793, 359/794, 717, 748, 753, 691
See application file for complete search history.

(56) References Cited

U.S. PATENT DOCUMENTS

| 5,071,235 A * | 12/1991 | Mori et al. ..................... 359/692 |
| 6,885,508 B2 * | 4/2005 | Yamaguchi et al. .......... 359/717 |
| 7,110,190 B2 * | 9/2006 | Do et al. ....................... 359/717 |

* cited by examiner

*Primary Examiner* — Timothy J Thompson

(57) ABSTRACT

An optical lens system for taking image comprises, in order from an object side to an image side: a first lens element with positive refractive power having an aspheric convex object-side surface and an aspheric concave image-side surface; a second lens element with positive refractive power having an aspheric convex object-side surface and an aspheric concave image-side surface. Radii of curvature of the object-side surface of the first lens element, the object-side and image-side surfaces of the second lens element are R1, R3 and R4 respectively, focal lengths of the optical lens system for taking image, the first and second lens elements are f, f1, f2 respectively, an on-axis distance between the first and second lens elements is T12, a center thickness of the second lens element is CT2, they satisfy the relations: 0.76 mm$^{-1}$<1/R1<2.0 mm$^{-1}$; 0.4<R3/R4<1.15; 0.35<(f/f1)−(f/f2)<0.72; T12/CT2>1.0.

13 Claims, 4 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced from the early 7.4 um to the current 1.4 um. Therefore, there's increasing demand for miniaturization of the lens system.

To correct aberrations, a conventional mobile phone's lens assembly usually consists of three lens elements, one of the typical structures is the positive-negative-positive Triplet type. However, when the length of the lens assembly is reduced from 5 mm to less than 3 mm, less space is available for the optical system, making it difficult to incorporate three lens elements into the space of the optical system. Furthermore, the lens elements must become thinner, causing poor uniformity if the lens is made from plastic injection molding.

The present invention mitigates and/or obviates the aforementioned disadvantages.

SUMMARY OF THE INVENTION

The primary objective of the present invention is to provide an optical lens system for taking image comprising two lens elements to improve image quality, and effectively reduce the volume of the optical lens system.

An optical lens system for taking image in accordance with the present invention comprises: in order from the object side to the image side: a first lens element with positive refractive power having a convex object-side surface and a concave image-side surface, the object-side and the image-side surfaces of the first lens element being aspheric; and a second lens element with positive refractive power having a convex object-side surface and a concave image-side surface, the object-side and the image-side surfaces of the second lens element being aspheric. Such a lens arrangement can effectively improve the image quality of the system.

In the present optical lens system for taking image, the refractive power of the system is mainly provided by the first lens element. The second lens element serves as a correction lens element to balance and correct various aberrations caused by the optical lens system.

The first lens element provides most of the positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photo-sensitive power of current solid-state sensors, since they are more sensitive when the light is incident at a small angle. This also reduces the probability of the occurrence of shading.

With the trend of miniaturization of the optical lens system and the requirement of increasing the field of view, the focal length of the optical lens system is becoming very short. Therefore, the radius of curvature and the size of the lens elements must be very small, and it is difficult to make such glass lens elements by the use of conventional grinding. Plastic material is introduced to make lens elements by injection molding, using relatively low cost to produce high precision lens elements. The lens elements are provided with aspheric surfaces, allowing more design parameter freedom (than spherical surfaces), so as to better reduce aberrations and consequently the number of the lens elements required.

According to one aspect of the present invention, in the present optical lens system for taking image, the refractive index of the first lens element is N1, the refractive index of the second lens element is N2, and they satisfy the relations:

$$1.52 < N1 < 1.59;$$

$$1.52 < N2 < 1.59.$$

If N1 and N2 satisfy the above relations, it is easy to find suitable plastic material to match the optical lens system. Further, it will be better if N1 and N2 satisfy the relations:

$$1.54 < N1 < 1.59;$$

$$1.54 < N2 < 1.59.$$

According to another aspect of the present invention, in the present optical lens system for taking image, the focal length of the optical lens system for taking image is f, the focal length of the first lens element is f1, and they satisfy the relation:

$$0.5 < f/f1 < 1.0.$$

If f/f1 satisfies the above relation, the refractive power of the first lens element is more balanced, thus allowing effective control of the total track length of the optical lens system, so as to maintain the objective of miniaturization of the optical lens system for taking image. Also, it will be favorable for correcting the high order aberrations of the system, improving the image quality of the optical lens system.

According to another aspect of the present invention, in the present optical lens system for taking image, the focal length of the optical lens system for taking image is f, the focal length of the second lens element is f2, and they satisfy the relation:

$$0.15 < f/f2 < 0.45.$$

If f/f2 satisfies the above relation, the second lens element serves as a correction lens elements to balance and correct various aberrations caused by the optical lens system. Further, it will be better if f/f1 and f/f2 satisfy the relation:

$$0.35 < (f/f1) - (f/f2) < 0.72.$$

According to another aspect of the present invention, in the present optical lens system for taking image, the radius of curvature of the object-side surface of the second lens element is R3, the radius of curvature of the image-side surface of the second lens element is R4, and they satisfy the relation:

$$0.4 < R3/R4 < 1.15.$$

If R3 and R4 satisfy the above relation, it will be favorable to correct the high order aberrations of the system. Further, it will be better if R3 and R4 satisfy the relation:

$$0.6 < R3/R4 < 0.9.$$

Further, it will be even better if R3 and R4 satisfy the relation:

$$0.7 < R3/R4 < 0.85.$$

According to another aspect of the present invention, in the present optical lens system for taking image, the radius of curvature of the object-side surface of the first lens element is R1, and it satisfies the relation:

$$0.76\ mm^{-1} < 1/R1 < 2.0\ mm^{-1}.$$

If 1/R1 satisfies the above relation, the refractive power of the first lens element is more balanced, thus allowing effective control of the total track length of the optical lens system, so as to maintain the objective of miniaturization of the optical lens system for taking image without producing too much high order aberrations. Further, it will be better if 1/R1 satisfies the relation:

$$0.8\ mm^{-1} < 1/R1 < 1.4\ mm^{-1}.$$

Further, it will be even better if 1/R1 satisfies the relation:

$$0.8\ mm^{-1} < 1/R1 < 1.2\ mm^{-1}.$$

According to another aspect of the present invention, in the present optical lens system for taking image, the on-axis distance between the first lens element and the second lens element is T12, the center thickness of the second lens element is CT2, and they satisfy the relation:

$$T12/CT2 > 1.0.$$

If T12/CT2 satisfies the above relation, the off-axis aberration of the optical lens system can be effectively corrected. Further, it will be better if T12/CT2 satisfies the relation:

$$T12/CT2 > 1.2.$$

Further, it will be even better if T12/CT2 satisfies the relation:

$$T12/CT2 > 1.45.$$

According to another aspect of the present invention, in the present optical lens system for taking image, the maximum image height of the optical lens system for taking image is ImgH, which is defined as half of the length of the diagonal of the electronic imaging sensor's effective pixel region, the entrance pupil diameter is EPD, half of the maximal field of view is HFOV, and they satisfy the relation:

$$ImgH/[(EPD) \times \tan(HFOV)] < 3.35.$$

If ImgH, EPD and HFOV satisfy the above relation, the brightness of the system can be effectively increased, enabling a faster lens system.

According to another aspect of the present invention, in the present optical lens system for taking image, the angle of the image-side surface of the second lens element at the position of its effective optical diameter is ANG22, and it satisfies the relation:

$$ANG22 < -35\ deg.$$

The above relation can effectively reduce the incident angle of the off axis light on the sensor, and allow better correction of the off-axis aberrations of the system.

The angle of a surface at the position of the effective diameter is defined as: the angle between the tangential plane, Plane Tan, passing through that point and a plane, Plane Norm, normal to the optical axis and passing through that point. Let T and N be the points of intersection between the optical axis and these two planes Plane Tan and Plane Norm, respectively. This angle is less than 90 degree in absolute value. The sign of the angle is taken to be negative if N is closer than T to the object side of the optical lens system, and positive otherwise.

According to another aspect of the present invention, in the present optical lens system for taking image, an object to be photographed is imaged on an electronic imaging sensor, the total track length of the optical lens system for taking image is TTL, which is defined as the distance from the object-side surface of the first lens element to the image plane along the optical axis, the maximum image height of the optical lens system for taking image is ImgH, and they satisfy the relation:

$$TTL/ImgH < 2.4.$$

The above relation can maintain the objective of miniaturization of the optical lens system for taking image.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
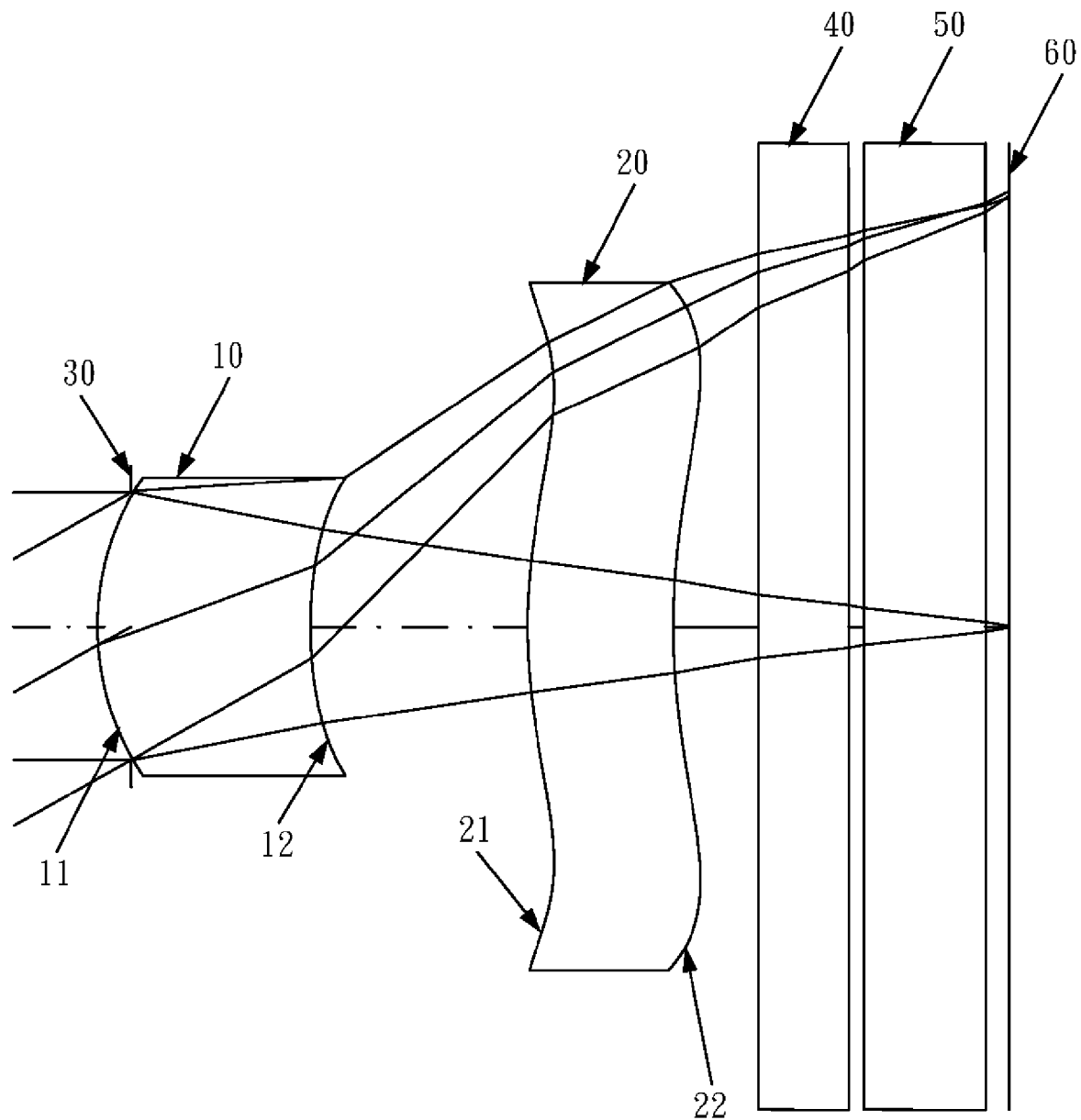
FIG. 1A shows an optical lens system for taking image in accordance with a first embodiment of the present invention.
Figure 1B:
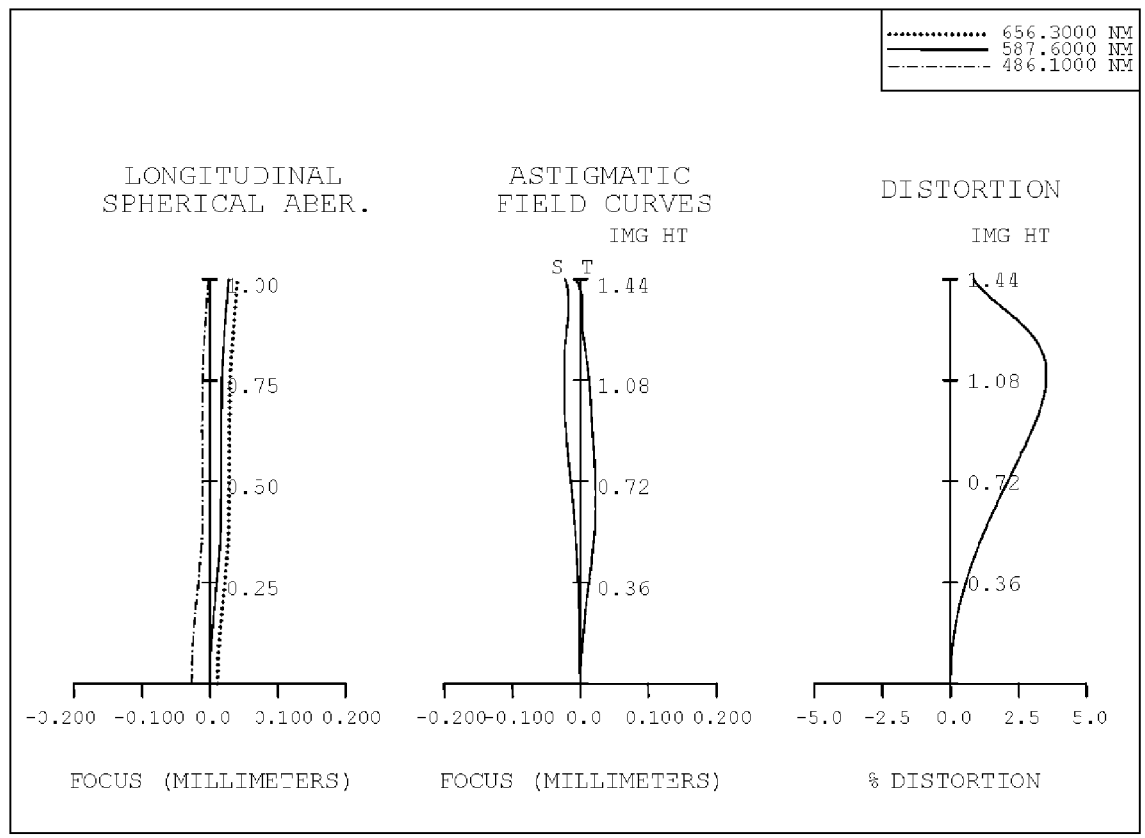
FIG. 1B shows the aberration curves of the first embodiment of the present invention.

Referring to FIG. 1A, which shows an optical lens system for taking image in accordance with a first embodiment of the present invention, and FIG. 1B shows the aberration curves of the first embodiment of the present invention. An optical lens system for taking image in accordance with the first embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with positive refractive power has a convex object-side surface 21 and a concave image-side surface 22, and the object-side surface 21 and the image-side surface 22 of the second lens element 20 are aspheric.

An aperture stop 30 located between an object to be photographed and the first lens element 10.

An IR cut filter 40 is located behind the second lens element 20 and has no influence on the focal length of the optical lens system.

A sensor cover glass 50 is located behind the IR cut filter 40 and has no influence on the focal length of the optical lens system.

An image plane 60 is located behind the sensor cover glass 50.

The equation for the aspheric surface profiles of the first embodiment is expressed as follows:

$$X(Y) = (Y^2 R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;
k: the conic coefficient;
Ai: the aspheric surface coefficient of order i.

In the first embodiment of the present optical lens system for taking image, the focal length of the optical lens system for taking image is f, the focal length of the first lens element is f1, the focal length of the second lens element is f2, and they satisfy the relations:

$f$=2.53 mm;

$f/f1$=0.84;

$f/f2$=0.21;

$(f/f1)-(f/f2)$=0.63.

In the first embodiment of the present optical lens system for taking image, the refractive index of the first lens element is N1, and it satisfies the relation:

$N1$=1.543.

In the first embodiment of the present optical lens system for taking image, the refractive index of the second lens element is N2, and it satisfies the relation:

$N2$=1.543.

In the first embodiment of the present optical lens system for taking image, the radius of curvature of the object-side surface of the first lens element is R1, the radius of curvature of the object-side surface of the second lens element is R3, the radius of curvature of the image-side surface of the second lens element is R4, and they satisfy the relations:

$1/R1$=1.11 mm$^{-1}$;

$R3/R4$=0.78.

In the first embodiment of the present optical lens system for taking image, the on-axis distance between the first lens element and the second lens element is T12, the center thickness of the second lens element is CT2, and they satisfy the relation:

$T12/CT2$=1.49.

In the first embodiment of the present optical lens system for taking image, the maximum image height of the optical lens system for taking image is ImgH, the entrance pupil diameter is EPD, half of the maximal field of view is HFOV, and they satisfy the relation:

$ImgH/[(EPD) \times \tan(HFOV)]$=2.89.

In the first embodiment of the present optical lens system for taking image, the angle of the image-side surface of the second lens element at the position of its effective optical diameter is ANG22, and it satisfies the relation:

$ANG22$=−42.1 deg.

In the first embodiment of the present optical lens system for taking image, the total track length of the optical lens system for taking image is TTL, the maximum image height of the optical lens system for taking image is ImgH, and they satisfy the relation:

$TTL/ImgH$=2.09.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 2.53 mm, Fno = 2.85, HFOV (half of field of view) = 29.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.11 | | | | |
| 2 | Lens 1 | 0.89870(ASP) | 0.704 | Plastic | 1.543 | 56.5 | 3.02 |
| 3 | | 1.44133(ASP) | 0.715 | | | | |
| 4 | Lens 2 | 1.85616(ASP) | 0.481 | Plastic | 1.543 | 56.5 | 11.85 |
| 5 | | 2.37015(ASP) | 0.280 | | | | |
| 6 | IR-filter | Plano | 0.300 | Glass | 1.517 | 64.2 | |
| 7 | | Plano | 0.050 | | | | |
| 8 | Sensor cover glass | Plano | 0.400 | Glass | 1.517 | 64.2 | |
| 9 | | Plano | 0.079 | | | | |
| 10 | Image | Plano | | | | | |

TABLE 2

Aspheric Coefficients

| | Surface # | | | |
|---|---|---|---|---|
| | 2 | 3 | 4 | 5 |
| K = | −7.52636E+00 | −3.77899E+00 | −4.35047E+00 | −5.50963E+00 |
| A4 = | 1.22824E+00 | 4.44061E−01 | −1.62067E−01 | −2.71647E−02 |
| A6 = | −2.81958E+00 | 5.82121E−01 | 2.07084E−01 | −3.51300E−02 |
| A8 = | 6.25942E+00 | −2.33373E+00 | −5.18754E−01 | −1.04913E−01 |
| A10 = | −6.20435E+00 | 2.07083E+01 | 3.82492E−01 | 7.27170E−02 |
| A12 = | 8.16578E−01 | −3.96052E+01 | −8.12593E−02 | −1.85814E−02 |

Figure 2A:
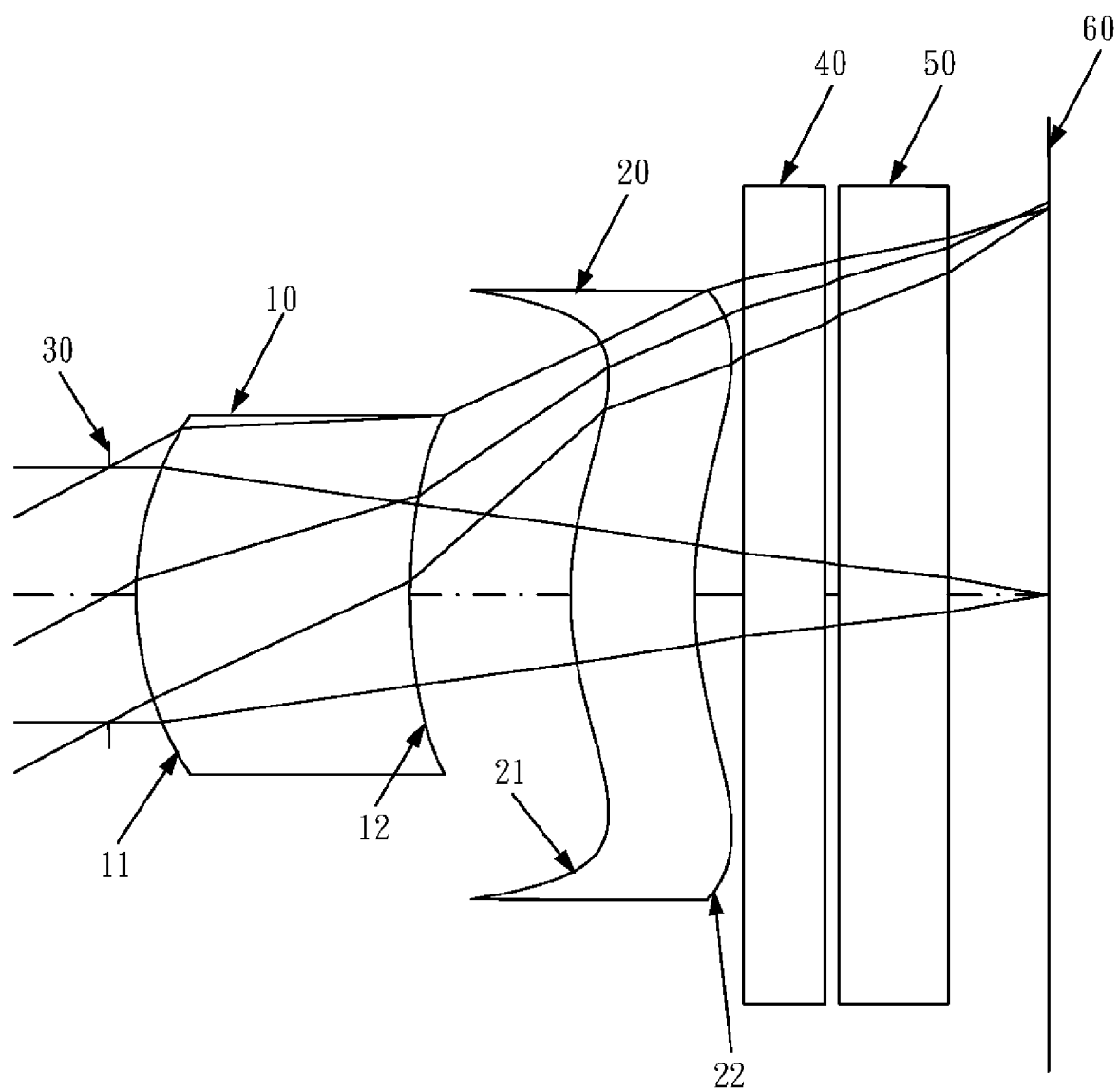
FIG. 2A shows an optical lens system for taking image in accordance with a second embodiment of the present invention.
Figure 2B:
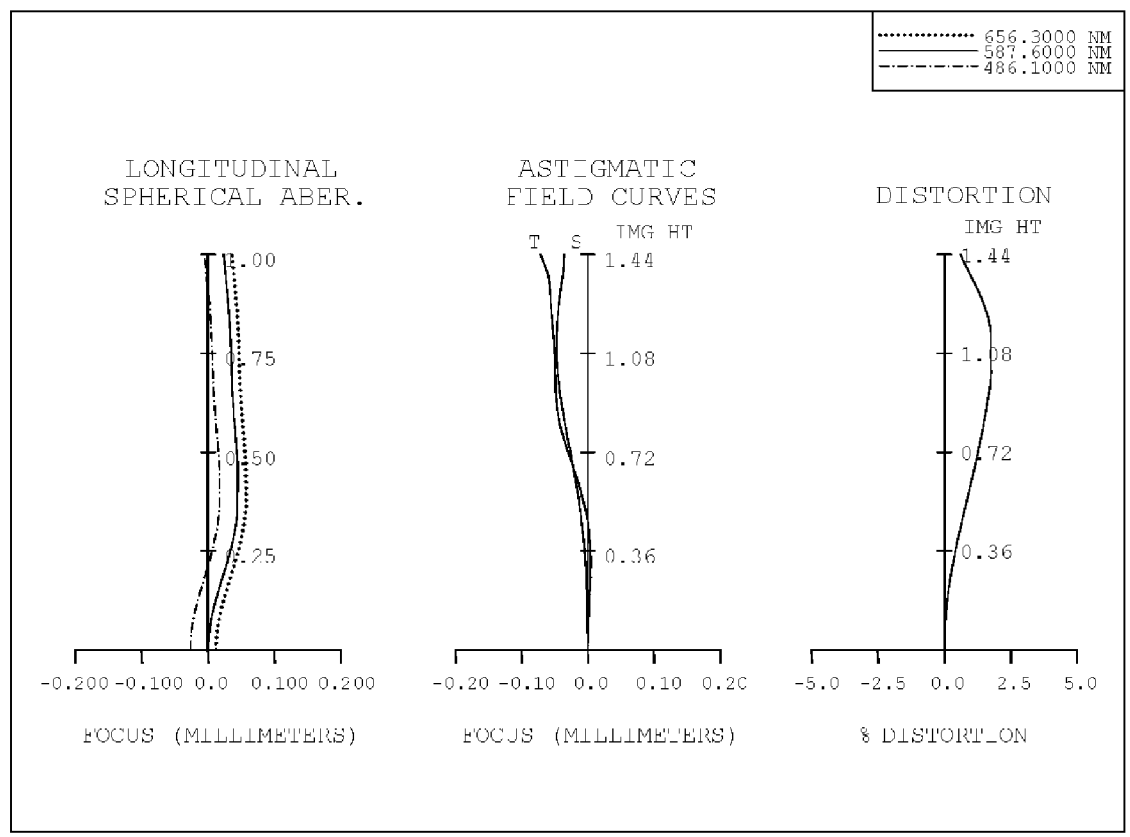
FIG. 2B shows the aberration curves of the second embodiment of the present invention.

Referring to FIG. 2A, which shows an optical lens system for taking image in accordance with a second embodiment of the present invention, and FIG. 2B shows the aberration curves of the second embodiment of the present invention. The second embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with positive refractive power has a convex object-side surface 21 and a concave image-side surface 22, and the object-side surface 21 and the image-side surface 22 of the second lens element 20 are aspheric.

An aperture stop 30 located between an object to be photographed and the first lens element 10.

An IR cut filter 40 is located behind the second lens element 20 and has no influence on the focal length of the optical lens system.

A sensor cover glass 50 is located behind the IR cut filter 40 and has no influence on the focal length of the optical lens system.

An image plane 60 is located behind the sensor cover glass 50.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the second lens element is f2, and they satisfy the relations:

$f=2.71$ mm;

$f/f1=0.74$;

$f/f2=0.36$;

$(f/f1)-(f/f2)=0.38$.

In the second embodiment of the present optical lens system for taking image, the refractive index of the first lens element is N1, and it satisfies the relation:

$N1=1.543$.

In the second embodiment of the present optical lens system for taking image, the refractive index of the second lens element is N2, and it satisfies the relation:

$N2=1.543$.

In the second embodiment of the present optical lens system for taking image, the radius of curvature of the object-side surface of the first lens element is R1, the radius of curvature of the object-side surface of the second lens element is R3, the radius of curvature of the image-side surface of the second lens element is R4, and they satisfy the relations:

$1/R1=0.85$ mm$^{-1}$;

$R3/R4=0.79$.

In the second embodiment of the present optical lens system for taking image, the on-axis distance between the first lens element and the second lens element is T12, the center thickness of the second lens element is CT2, and they satisfy the relation:

$T12/CT2=1.29$.

In the second embodiment of the present optical lens system for taking image, the maximum image height of the optical lens system for taking image is ImgH, the entrance pupil diameter is EPD, half of the maximal field of view is HFOV, and they satisfy the relation:

$ImgH/[(EPD)\times\tan(HFOV)]=2.89$.

In the second embodiment of the present optical lens system for taking image, the angle of the image-side surface of the second lens element at the position of its effective optical diameter is ANG22, and it satisfies the relation:

$ANG22=-43.3$ deg.

In the second embodiment of the present optical lens system for taking image, the total track length of the optical lens system for taking image is TTL, the maximum image height of the optical lens system for taking image is ImgH, and they satisfy the relation:

$TTL/ImgH=2.33$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 2.71 mm, Fno = 2.85, HFOV (half of field of view) = 28.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | 0.100 | | | | |
| 2 | Lens 1 | 1.17189(ASP) | 1.005 | Plastic | 1.543 | 56.5 | 3.64 |
| 3 | | 2.00823(ASP) | 0.589 | | | | |
| 4 | Lens 2 | 1.25202(ASP) | 0.456 | Plastic | 1.543 | 56.5 | 7.46 |
| 5 | | 1.57953(ASP) | 0.180 | | | | |
| 6 | IR-filter | Plano | 0.300 | Glass | 1.517 | 64.2 | |
| 7 | | Plano | 0.050 | | | | |
| 8 | Sensor cover glass | Plano | 0.400 | Glass | 1.517 | 64.2 | |
| 9 | | Plano | 0.368 | | | | |
| 10 | Image | Plano | | | | | |

TABLE 4

Aspheric Coefficients

| | Surface # | | | |
|---|---|---|---|---|
| | 2 | 3 | 4 | 5 |
| k = | −2.02939E+01 | −1.01140E+01 | −2.43267E+00 | −7.95346E+00 |
| A4 = | 1.29193E+00 | 3.19169E−03 | −2.25408E−01 | 9.99746E−02 |
| A6 = | −5.01119E+00 | 9.35328E−01 | 3.39560E−01 | −3.14654E−01 |
| A8 = | 1.54911E+01 | −2.50172E+00 | −9.98062E−01 | 1.46317E−01 |
| A10 = | −2.72933E+01 | 4.31888E+00 | 1.15418E+00 | −7.22344E−03 |
| A12 = | 2.01054E+01 | −2.66785E+00 | −5.67811E−01 | −2.18874E−02 |

TABLE 5

| | Embodiment 1 | Embodiment 2 |
|---|---|---|
| F | 2.53 | 2.71 |
| Fno | 2.85 | 2.85 |
| HFOV | 29.4 | 28.0 |
| f/f1 | 0.84 | 0.74 |
| f/f2 | 0.21 | 0.36 |
| (f/f1) − (f/f2) | 0.63 | 0.38 |
| 1/R1 | 1.11 | 0.85 |
| R3/R4 | 0.78 | 0.79 |
| N1 | 1.543 | 1.543 |
| N2 | 1.543 | 1.543 |
| T12/CT2 | 1.49 | 1.29 |
| ImgH/[(EPD) × tan(HFOV)] | 2.89 | 2.89 |
| ANG22 | −42.1 | −43.3 |
| TTL/ImgH | 2.09 | 2.33 |

In the present optical lens system for taking image, the lens elements can be made of glass or plastic. If the lens elements are made of glass, there is more freedom in distributing the refractive power of the optical lens system. If the lens elements are made of plastic, the cost will be effectively reduced.

It is to be noted that the tables 1-4 show different data from the different embodiments, however, the data of the different embodiments is obtained from experiments. Therefore, any product of the same structure is deemed to be within the scope of the present invention even if it uses different data. Table 5 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, in order from an object side to an image side:
    a first lens element with positive refractive power having a convex object-side surface and a concave image-side surface, the object-side and the image-side surfaces of the first lens element being aspheric;
    a second lens element with positive refractive power having a convex object-side surface and a concave image-side surface, the object-side and the image-side surfaces of the second lens element being aspheric;
    the first lens element and the second lens element made of plastic material;
    an aperture stop located between an object to be photographed and the first lens element;
    a radius of curvature of the object-side surface of the first lens element being R1, a radius of curvature of the object-side surface of the second lens element being R3, a radius of curvature of the image-side surface of the second lens element being R4, a focal length of the optical lens system for taking image being f, a focal length of the first lens element being f1, a focal length of the second lens element being f2, an on-axis distance between the first lens element and the second lens element being T12, a center thickness of the second lens element being CT2, and they satisfying the relations:

$0.76 \text{ mm}^{-1} < 1/R1 < 2.0 \text{ mm}^{-1}$;

$0.4 < R3/R4 < 1.15$;

$0.35 < (f/f1) − (f/f2) < 0.72$;

$T12/CT2 > 1.0$;

$0.5 < f/f1 < 1.0$;

$0.15 < f/f2 < 0.45$ and in the optical lens system for taking image, the number of lens elements with refractive power being only two.

2. The optical lens system for taking image as claimed in claim 1, wherein a refractive index of the first lens element is N1, a refractive index of the second lens element is N2, and they satisfy the relations:

$1.52 < N1 < 1.59$;

$1.52 < N2 < 1.59$.

3. The optical lens system for taking image as claimed in claim 2, wherein the refractive index of the first lens element is N1, the refractive index of the second lens element is N2, and they satisfy the relations:

$1.54 < N1 < 1.59$;

$1.54 < N2 < 1.59$.

4. An optical lens system for taking image comprising, in order from an object side to an image side:
    a first lens element with positive refractive power having a convex object-side surface and a concave image-side surface, the object-side and the image-side surfaces of the first lens element being aspheric;
    a second lens element with positive refractive power having a convex object-side surface and a concave image-side surface, the object-side and the image-side surfaces of the second lens element being aspheric;
    a radius of curvature of the object-side surface of the first lens element being R1, a radius of curvature of the object-side surface of the second lens element being R3, a radius of curvature of the image-side surface of the second lens element being R4, a focal length of the optical lens system for taking image being f, a focal length of the first lens element being f1, a focal length of the second lens element being f2, an on-axis distance between the first lens element and the second lens element being T12, a center thickness of the second lens element being CT2, and they satisfying the relations:

$0.76\ \text{mm}^{-1} < 1/R1 < 2.0\ \text{mm}^{-1}$;

$0.35 < (f/f1) - (f/f2) < 0.72$;

$T12/CT2 > 1.0$;

$0.6 < R3/R4 < 0.9$;

and in the optical lens system for taking image, the number of lens elements with refractive power being only two.

5. The optical lens system for taking image as claimed in claim 2, wherein the radius of curvature of the object-side surface of the second lens element is R3, the radius of curvature of the image-side surface of the second lens element is R4, and they satisfy the relation:

$0.7 < R3/R4 < 0.85$.

6. The optical lens system for taking image as claimed in claim 2, wherein the radius of curvature of the object-side surface of the first lens element is R1, and it satisfies the relation:

$0.8\ \text{mm}^{-1} < 1/R1 < 1.4\ \text{mm}^{-1}$.

7. The optical lens system for taking image as claimed in claim 3, wherein the radius of curvature of the object-side surface of the first lens element is R1, and it satisfies the relation:

$0.8\ \text{mm}^{-1} < 1/R1 < 1.2\ \text{mm}^{-1}$.

8. The optical lens system for taking image as claimed in claim 2, wherein the on-axis distance between the first lens element and the second lens element is T12, the center thickness of the second lens element is CT2, and they satisfy the relation:

$T12/CT2 > 1.2$.

9. The optical lens system for taking image as claimed in claim 3, wherein the on-axis distance between the first lens element and the second lens element is T12, the center thickness of the second lens element is CT2, and they satisfy the relation:

$T12/CT2 > 1.45$.

10. An optical lens system for taking image comprising, in order from an object side to an image side:
- a first lens element with positive refractive power having a convex object-side surface and a concave image-side surface, the object-side and the image-side surfaces of the first lens element being aspheric;
- a second lens element with positive refractive power having a convex object-side surface and a concave image-side surface, the object-side and the image-side surfaces of the second lens element being aspheric;
- a radius of curvature of the object-side surface of the first lens element being R1, a radius of curvature of the object-side surface of the second lens element being R3, a radius of curvature of the image-side surface of the second lens element being R4, a focal length of the optical lens system for taking image being f, a focal length of the first lens element being f1, a focal length of the second lens element being f2, an on-axis distance between the first lens element and the second lens element being T12, a center thickness of the second lens element being CT2, and they satisfying the relations:

$0.76\ \text{mm}^{-1} < 1/R1 < 2.0\ \text{mm}^{-1}$;

$0.4 < R3/R4 < 1.15$;

$0.35 < (f/f1) - (f/f2) < 0.72$;

$T12/CT2 > 1.0$;

and in the optical lens system for taking image, the number of lens elements with refractive power being only two;
a maximum image height of the optical lens system for taking image being ImgH, an entrance pupil diameter being EPD, half of the maximal field of view being HFOV, and they satisfying the relation:

$\text{ImgH}/[(\text{EPD}) \times \tan(\text{HFOV})] < 3.35$.

11. An optical lens system for taking image comprising, in order from an object side to an image side:
- a first lens element with positive refractive power having a convex object-side surface and a concave image-side surface, the object-side and the image-side surfaces of the first lens element being aspheric;
- a second lens element with positive refractive power having a convex object-side surface and a concave image-side surface, the object-side and the image-side surfaces of the second lens element being aspheric;
- a radius of curvature of the object-side surface of the first lens element being R1, a radius of curvature of the object-side surface of the second lens element being R3, a radius of curvature of the image-side surface of the second lens element being R4, a focal length of the optical lens system for taking image being f, a focal length of the first lens element being f1, a focal length of the second lens element being f2, an on-axis distance between the first lens element and the second lens element being T12, a center thickness of the second lens element being CT2, and they satisfying the relations:

$0.76\ \text{mm}^{-1} < 1/R1 < 2.0\ \text{mm}^{-1}$;

$0.4 < R3/R4 < 1.15$;

$0.35 < (f/f1) - (f/f2) < 0.72$;

$T12/CT2 > 1.0$;

and in the optical lens system for taking image, the number of lens elements with refractive power being only two;
an angle of the image-side surface of the second lens element at the position of its effective optical diameter being ANG22, and it satisfying the relation:

$\text{ANG22} < -35\ \text{deg}$.

12. An optical lens system for taking image comprising, in order from an object side to an image side:
- a first lens element with positive refractive power having a convex object-side surface and a concave image-side surface, the object-side and the image-side surfaces of the first lens element being aspheric;
- a second lens element with positive refractive power having a convex object-side surface and a concave image-side surface, the object-side and the image-side surfaces of the second lens element being aspheric;
- a radius of curvature of the object-side surface of the first lens element being R1, a radius of curvature of the object-side surface of the second lens element being R3, a radius of curvature of the image-side surface of the second lens element being R4, a focal length of the optical lens system for taking image being f, a focal length of the first lens element being f1, a focal length of the second lens element being f2, an on-axis distance between the first lens element and the second lens ele ment being T12, a center thickness of the second lens element being CT2, and they satisfying the relations:

$0.76 \text{ mm}^{-1} < 1/R1 < 2.0 \text{ mm}^{-1}$;

$0.4 < R3/R4 < 1.15$;

$0.35 < (f/f1) - (f/f2) < 0.72$;

$T12/CT2 > 1.0$;

and in the optical lens system for taking image, the number of lens elements with refractive power being only two;

an object to be photographed is imaged on an electronic imaging sensor, a total track length of the optical lens system for taking image being TTL, a maximum image height of the optical lens system for taking image being ImgH, and they satisfying the relation:

$TTL/ImgH < 2.4$.

13. An optical lens system for taking image comprising, in order from the object side to the image side:

a first lens element with positive refractive power having a convex object-side surface and a concave image-side surface;

a second lens element with positive refractive power having a convex object-side surface and a concave image-side surface; a refractive index of the first lens element being N1, a refractive index of the second lens element being N2, and they satisfying the relations:

$1.54 < N1 < 1.59$;

$1.54 < N2 < 1.59$ and in the optical lens system for taking image, the number of lens elements with refractive power being only two.

* * * * *